United States Patent
Kollep et al.

(10) Patent No.: US 10,548,428 B2
(45) Date of Patent: Feb. 4, 2020

(54) BEVERAGE PREPARATION UNIT

(71) Applicant: Nestec S. A., Vevey (CH)

(72) Inventors: Alexandre Kollep, Lutry (CH);
Philippe Dumur, Serraval (FR);
Nicolas Delay, Cully (CH)

(73) Assignee: Societe des Produits S.A., Vevey (CH)

( * ) Notice: Subject to any disclaimer, the term of this patent is extended or adjusted under 35 U.S.C. 154(b) by 235 days.

(21) Appl. No.: 15/303,153

(22) PCT Filed: May 8, 2015

(86) PCT No.: PCT/EP2015/060142
§ 371 (c)(1),
(2) Date: Oct. 10, 2016

(87) PCT Pub. No.: WO2015/173127
PCT Pub. Date: Nov. 19, 2015

(65) Prior Publication Data
US 2017/0035235 A1   Feb. 9, 2017

(30) Foreign Application Priority Data

May 12, 2014 (EP) .................................... 14167848

(51) Int. Cl.
*A47J 31/00* (2006.01)
*A47J 31/36* (2006.01)

(52) U.S. Cl.
CPC ....... *A47J 31/3695* (2013.01); *A47J 31/3623* (2013.01); *A47J 31/369* (2013.01); *A47J 31/3628* (2013.01)

(58) Field of Classification Search
CPC ........ A47J 31/005; A47J 31/04; A47J 31/369; A47J 31/3695; A47J 31/46; A47J 31/468; A47J 31/3623; A47J 31/3628
(Continued)

(56) References Cited

U.S. PATENT DOCUMENTS

2008/0302252 A1   12/2008  O'Brien et al.
2011/0103779 A1   5/2011   Baston
(Continued)

FOREIGN PATENT DOCUMENTS

DE   102008007254 A1     8/2008
DE   102009048233 A1 *   4/2010   ............ A47J 31/005
(Continued)

OTHER PUBLICATIONS

International Search Report, dated Aug. 12, 2015, in PCT/EP2015/060139, filed May 8, 2015.
(Continued)

*Primary Examiner* — Reginald Alexander
(74) *Attorney, Agent, or Firm* — K&L Gates LLP

(57) ABSTRACT

A beverage preparation device for preparing a beverage from an ingredients containing capsule includes a beverage brewing unit for receiving the capsule and preparing the beverage by means of injection of pressurized liquid into the capsule, and beverage dispensing means for dispensing the resulting beverage into a receptacle, wherein beverage brewing unit is designed for passing liquid through the capsule in a direction essentially opposite to gravity. Systems that include the beverage preparation device and methods of producing and using said device are also disclosed.

11 Claims, 8 Drawing Sheets

(58) Field of Classification Search
USPC .......................................................... 99/295
See application file for complete search history.

(56) References Cited

U.S. PATENT DOCUMENTS

| | | |
|---|---|---|
| 2013/0036914 A1 | 2/2013 | Icardi et al. |
| 2013/0078342 A1 | 3/2013 | Loebl |
| 2013/0312617 A1 | 11/2013 | Toporovsky |

FOREIGN PATENT DOCUMENTS

| | | |
|---|---|---|
| DE | 102009048233 A1 | 4/2010 |
| WO | 2011053890 A2 | 5/2011 |

OTHER PUBLICATIONS

Written Opinion of the International Searching Authority, dated Aug. 12, 2015, in PCT/EP2015/060139, filed May 8, 2015.
International Search Report, dated Nov. 27, 2015, in PCT/EP2015/060142, filed May 8, 2015.
Written Opinion of the International Searching Authority, dated Nov. 27, 2015, in PCT/EP2015/060142, filed May 8, 2015.
International Search Report, dated Jun. 15, 2015, in PCT/EP2015/060143, filed May 8, 2015.
Written Opinion of the International Searching Authority, dated Jun. 15, 2015, in PCT/EP2015/060143, filed May 8, 2015.

\* cited by examiner

BEVERAGE PREPARATION UNIT

CROSS REFERENCE TO RELATED APPLICATIONS/INCORPORATION BY REFERENCE STATEMENT

This application is a U.S. national stage application filed under 35 USC § 371 of International Application No. PCT/EP2015/060142, filed May 8, 2015; which claims priority to Application No. EP 14167848.2, filed May 12, 2014. The entire contents of the above-referenced application are hereby expressly incorporated herein by reference.

TECHNICAL FIELD

The presently disclosed and/or claimed inventive concept(s) relates to a system for preparing a beverage from a beverage ingredients containing capsule. In particular, the presently disclosed and/or claimed inventive concept(s) relates to a beverage preparation device for enhanced dispensing of a beverage from the device.

BACKGROUND

Devices for preparation of a beverage such as coffee or tea from ingredients containing capsules are well-known in the prior art. These devices are generally stationary devices equipped with a liquid tank, a pump and heating means in order to provide pressurized, heated liquid through a capsule inserted into the device. The liquid is injected into the capsule and will interact with the ingredients provided in the capsule. The resulting beverage is then drained from the capsule and may be collected in a dedicated receiving vessel.

A drawback of the known systems is the fact that these devices are designed for stationary use only. This means that the device has to be placed at a fixed location within the household, close to a main power supply. In addition, the device has to be placed close to a water supply in order to enable filling or re-filling of the liquid into a liquid tank of the device. The beverage preparation can thus only be carried out at a predefined stationary location of the device.

Therefore, portable devices have been proposed which enable the preparation and provision of a hot beverage such as in particular a coffee beverage at remote places.

EP 1 277 428 for example relates to an espresso coffee machine designed for use in conjunction with a low-voltage power supply of a vehicle, the machine comprising a water reservoir connected to a pump to convey water to a heating element, which itself is connected to an extraction head for providing a portion of coffee. The extraction head of the device is arranged for pouring a predefined portion of coffee beverage from above into a provided receiving vessel.

U.S. 2009/0029021 relates to a portable device for brewing a coffee beverage, the device comprising a water tank, a housing including a chamber presenting a hot water feed nozzle and an opening through which a fill of brew preparation can be inserted, a closure part for closing said chamber, means connected to the tank to act during a brewing cycle to deliver a certain volume of water that has been raised to a brewing temperature from said tank to said chamber, and a brew outflow orifice from which the resulting beverage may be poured into a suitable receiving vessel. The body of the device includes handle means enabling the outflow orifice to be placed, during the brewing cycle, to face down towards a receptacle such as e.g. a cup for collecting the beverage.

A major drawback of the known devices is the fact that the outlet orifice are generally arranged for pouring the prepared beverage from the device into a dedicated receiving vessel held below the outlet orifice. Thereby however, in particular for portable devices, the consumer is likely to spill at least part of the beverage during the draining from such outlet orifice. Thus, an enhanced solution is sought-after which enables a convenient and clean transfer of a beverage prepared by the portable beverage preparation device to a dedicated receiving vessel.

Furthermore, in view of the above-identified prior art appliances, a more compact arrangement for a beverage preparation device is sought-after.

The presently disclosed and/or claimed inventive concept(s) seeks to provide a solution to the before-mentioned problems and offers additional benefits to the existing prior art, which will become apparent in the following description.

BRIEF DESCRIPTION OF THE DRAWINGS

Further features, advantages and objects of the presently disclosed and/or claimed inventive concept(s) will become apparent for a skilled person when reading the following detailed description of embodiments of the presently disclosed and/or claimed inventive concept(s), when taken in conjunction with the figures of the enclosed drawings.

DETAILED DESCRIPTION

Figure 1A:
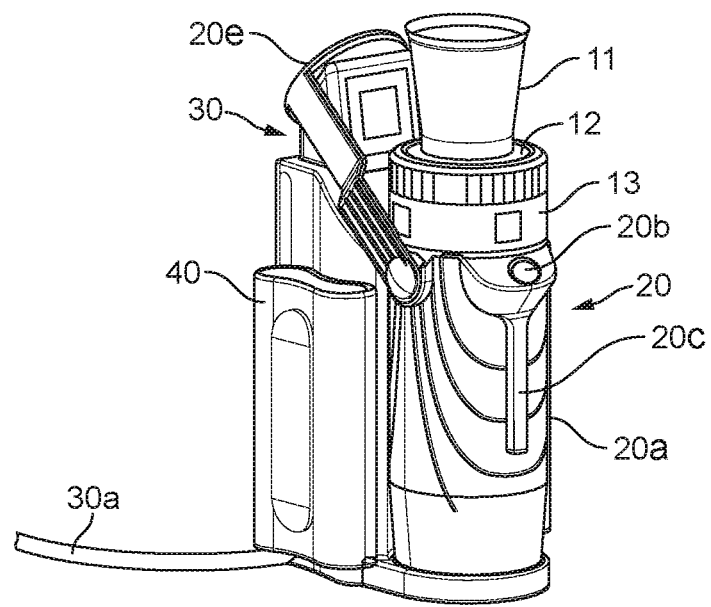
FIG. 1a is a perspective side view of a particular (but non-limiting) embodiment of the portable beverage preparation device being connected to a docking station.

In a first aspect, the presently disclosed and/or claimed inventive concept(s) relates to a beverage preparation device for preparing a beverage from an ingredients containing capsule, the device comprising a beverage brewing unit for receiving the capsule and preparing the beverage from the ingredients within the capsule by means of injection of pressurized liquid into the capsule, beverage dispensing means connected to the beverage brewing unit and designed to selectively connect to a bottom of a receptacle for dispensing the resulting beverage into the receptacle, wherein beverage brewing unit is designed for passing liquid through the capsule in a direction essentially opposite to gravity.

The device according to the presently disclosed and/or claimed inventive concept(s) enables the preparation and supply of beverage to a dedicated receptacle, whereby filling of the receptacle with the beverage is obtained from below through a bottom wall of the receptacle. Accordingly, spilling of the beverage during provision of the beverage from the device to the receptacle is effectively prevented.

In certain non-limiting embodiments, the device according to the presently disclosed and/or claimed inventive concept(s) is a portable device. However, the device may also be a stationary device.

It is noted that the term "portable" beverage preparation device is to be understood as suitable for being used at remote places by contrast to a stationary beverage preparation device. In particular, the portable beverage preparation device according to the presently disclosed and/or claimed inventive concept(s) is designed for being used in transport such as e.g. in vehicles which, in certain non-limiting embodiments, provide low voltage current supply, for use outdoor, e.g. by means of using a battery pack, and/or at home or at the office. Thereby, in certain non-limiting embodiments, the beverage preparation device is designed for being provided with a low voltage current supply. Furthermore, the beverage preparation device may be designed for being selectively connected to a battery pack and/or a docking station or power converter unit.

In certain non-limiting embodiments, the beverage preparation device is designed for preparing espresso-type coffee at high pressure requiring high water pressure supply and high water temperature setting.

In certain non-limiting embodiments, the beverage preparation device comprises a pump, a heating unit and a liquid reservoir connected to the pump and the heating unit. Accordingly, hot pressurized liquid may be provided to the beverage brewing unit of the device. In certain non-limiting embodiments, the device is designed for preparing a beverage at a high pressure of between 10 to 15 bar. In certain non-limiting embodiments, the heating means of the device comprises two cartridge heaters designed for being supplied with 12 Volts nominal voltage. In certain non-limiting embodiments, the pump of the device is a membrane pump. In certain non-limiting embodiments, the pump is vibration-decoupled from a housing of the device.

In certain non-limiting embodiments, the liquid reservoir comprises a volume of between 30 to 100 ml, such as (but not limited to) between 40 and 60 ml. In a particular (but non-limiting) embodiment, the liquid reservoir comprises a volume to prepare a single beverage cup with the liquid contained therein, in particular a cup of espresso-type beverage. Due to the little volume of the liquid reservoir, heating of the liquid contained therein is accelerated. In particular, the heating means are, in certain non-limiting embodiments, designed for heating the liquid contained in the reservoir to about 90° C. in 2-4 minutes, such as (but not limited to) in about 3 minutes.

The beverage brewing unit comprises liquid inlet means connected to the liquid reservoir, the pump and the heating unit of the device. Accordingly, hot pressurized liquid such as water may be fed to the beverage brewing unit respectively to a capsule received by the beverage brewing unit. The liquid inlet means may be connected to an injection or opening member arranged within the beverage brewing unit to open an inlet face of the capsule. In certain non-limiting embodiments, the beverage dispensing means are extending from the beverage brewing unit at a side essentially opposite to the liquid inlet means. In certain non-limiting embodiments, the liquid inlet means are arranged at a lower portion of the beverage brewing unit. In certain non-limiting embodiments, the beverage dispensing means are connected to an upper portion of the beverage brewing unit.

Note that directions and orientations such as e.g. the terms "upper" or "upward" and "lower" are to be understood as referring to a working state of the beverage preparation device and not to an orientation of the device during transport or storage.

In a working state of the beverage preparation device, the liquid reservoir is, in certain non-limiting embodiments, arranged below the beverage brewing unit and the beverage dispensing means. In certain non-limiting embodiments, the beverage dispensing means are arranged above the beverage brewing unit. In certain non-limiting embodiments, a receptacle to be filled is arranged above the beverage brewing unit and the beverage dispensing means. In a particular (but non-limiting) embodiment, at least the pump, the beverage brewing unit and the beverage dispensing means of the device are desirably arranged essentially vertically, such as in particular vertically stacked within the device.

In certain non-limiting embodiments, the flow path of liquid through the beverage brewing unit and the beverage dispensing means is in a common upward direction. In particular, the flow path of liquid from the pump of the device to the beverage brewing unit and the beverage dispensing means is in a common direction. In certain non-limiting embodiments, the flow path of liquid through the device is without change of direction of the liquid flow.

According to such an arrangement, the distances between the individual components of the device are minimized such as to obtain a very compact arrangement of the beverage preparation device. Thereby, also the tubing necessary to fluidly connect the individual parts of the device may be shortened and hence, the amount of residual water to heat is minimized.

In certain non-limiting embodiments, the dispensing means comprise an injection member protruding from a support surface for the receptacle. In certain non-limiting embodiments, the support surface is a plane and/or round surface arranged at a top portion of the beverage preparation device.

In certain non-limiting embodiments, the beverage preparation device comprises a housing and a lid member that may be selectively connected to the housing. In certain non-limiting embodiments, the lid member is designed for enclosing a capsule within the brewing unit of the device. Thereby, the lid member may form an upper portion of the brewing unit.

On its upper portion, the lid member comprises, in certain non-limiting embodiments, the support surface for the receptacle from which the injection member protrudes.

In certain non-limiting embodiments, the lid member comprises the dispensing means of the device. In particular, the lid member may comprise capsule opening means such as in particular a pyramidal plate against which an outlet face of a capsule inserted into the brewing unit is urged upon rising pressure within the capsule during injection of liquid thereto. In certain non-limiting embodiments, the pyramidal plate comprises small orifices or interstices through which the beverage exiting the capsule at an upper outlet surface thereof may flow upwardly towards the injection member of the dispensing means. The resulting beverage may thus be fed from the brewing unit via the beverage dispensing means of the lid member to the receptacle arranged above the beverage dispensing means.

In certain non-limiting embodiments, the lid member is designed for being connected to a top portion of the housing of the device. Thereby, the lid member may be screwed or snap-fitted at the circumference of the housing of the device.

In certain non-limiting embodiments, the lid member comprises an outer circumferential lid portion and an inner central lid portion which are arranged rotatably relative to each other. The outer lid portion may comprise connection means for being connected to the housing of the device. Thereby, the connection means may engage dedicated recesses or connecting elements arranged at the housing of the device.

In a particular (but non-limiting) embodiment of the presently disclosed and/or claimed inventive concept(s), the inner lid portion is designed to selectively interact with rotation-prevention means (or anti-rotation means) arranged at the beverage brewing unit in order to prevent a relative movement of the central lid portion and a capsule arranged within the beverage brewing unit. In particular, upon connection of the lid member to the housing of the device, the rotation-prevention means such as e.g. serrations of the inner lid portion may engage with dedicated protrusions or serrations of the housing and/or the brewing unit of the device. Accordingly, a further rotational movement of the inner lid portion with respect to the outer lid portion is prevented. Hence, after the extraction process, the outer lid member may be rotated and thus disconnected from the housing while the inner lid portion will not undergo a rotational movement with respect to the beverage brewing unit and a capsule contained therein. This arrangement enables that a complete destruction of the capsule outlet membrane respectively outlet face when re-opening the lid member after extraction, during which an outlet face of the capsule was urged and teared by the pyramidal plate of the lid member, is prevented.

In certain non-limiting embodiments, the brewing unit of the device is designed to accommodate a rotational-symmetric capsule comprising a truncated-cone shaped body portion and a membrane connected to a circumferential rim portion of the body portion and constituting an outlet face thereof. The capsule is arranged within the brewing unit such that the circumferential rim portion and the membrane connected thereto are arranged at the upper side of the capsule.

The brewing unit may further comprise an ejection mechanism designed to eject the capsule from the brewing unit after the beverage preparation.

A further aspect of the presently disclosed and/or claimed inventive concept(s) relates to a portable beverage preparation device for preparing a beverage from an ingredients containing capsule, the device comprising a beverage brewing unit for receiving the capsule and preparing the beverage from the ingredients within the capsule by means of injection of pressurized liquid into the capsule, a lid member selectively connectable to the brewing unit in order to enclose a capsule provided thereto, wherein the lid member, in certain non-limiting embodiments, comprises beverage dispensing means designed to selectively connect to a bottom of a receptacle, and wherein the beverage brewing unit (or at least a part of it) is arranged moveable within a housing of the device such as to selectively open a fluid-connection from the brewing unit to a fluid reservoir of the device.

Accordingly, in case of the open fluid-connection from the brewing unit to the fluid reservoir, refilling of the fluid reservoir of the device via filling of liquid into the empty brewing unit is enabled. A user may thus remove the lid member from the brewing unit respectively the housing of the device and simply fill a predefined amount of liquid into the brewing unit in order to refill the liquid reservoir. Hence, a dedicated separate aperture or valve means at the device suitable for refilling purposes of the liquid reservoir may be omitted.

In a particular (but non-limiting) embodiment, the fluid-connection from the brewing unit to the fluid reservoir is opened dependent on the provision of the lid member to the device respectively the brewing unit. Thereby, in case no lid member is arranged at the device, the beverage brewing unit is, in certain non-limiting embodiments, urged in a direction away from the fluid reservoir such as to open a dedicated valve means, e.g. an annular passage enabling fluid flow from the beverage brewing unit to the liquid reservoir. This may be obtained by spring members that are arranged at the brewing unit. Upon closing of the lid member onto the device respectively the brewing unit, the brewing unit is urged in a direction towards to fluid reservoir, whereby the valve means, e.g. the annular fluid passage from the brewing unit to the liquid reservoir is closed.

In a further aspect, the presently disclosed and/or claimed inventive concept(s) relates to a system comprising a portable beverage preparation device as described here-above and a receptacle.

In certain non-limiting embodiments, the receptacle for being connected to the device comprises inlet means such as a valve or selectively openable aperture that is integrally formed in the bottom wall of the receptacle. The inlet means may for example be a valve or a self-closing membrane. In certain non-limiting embodiments, the closing strength of the valve or the membrane is selected to ensure that it can withstand at least the pressure exerted on it by liquid in the receptacle, in case the receptacle is filled completely, without any leakage.

In a further aspect, the presently disclosed and/or claimed inventive concept(s) relates to a method for preparing a beverage from ingredients contained within a capsule, the method comprising the steps of: connecting a beverage receptacle to a beverage dispensing means of a beverage preparation device, passing liquid through a capsule in a direction essentially opposite to gravity, dispensing the resulting beverage into the receptacle through a bottom of the receptacle.

In certain non-limiting embodiments, the capsule is thereby held within a dedicated beverage brewing unit to which the capsule may be selectively be inserted.

In a particular (but non-limiting) embodiment, the method further comprises the step of passing the liquid from a pump of the device through the capsule into the receptacle in a common direction, i.e. without change of direction of the liquid flow. In certain non-limiting embodiments, the liquid is pressurized hot water.

It is noted that, in certain non-limiting embodiments, the device according to the presently disclosed and/or claimed inventive concept(s) is designed to enable the preparation of a plurality of different types of hot and/or cold liquid comestibles such as e.g. coffee, tea, milk, soup of the like. Thereby, a large variety of beverages may be prepared dependent on the nature of the ingredients enclosed in a dedicated capsule to be associated with the device.

Figure 1B:
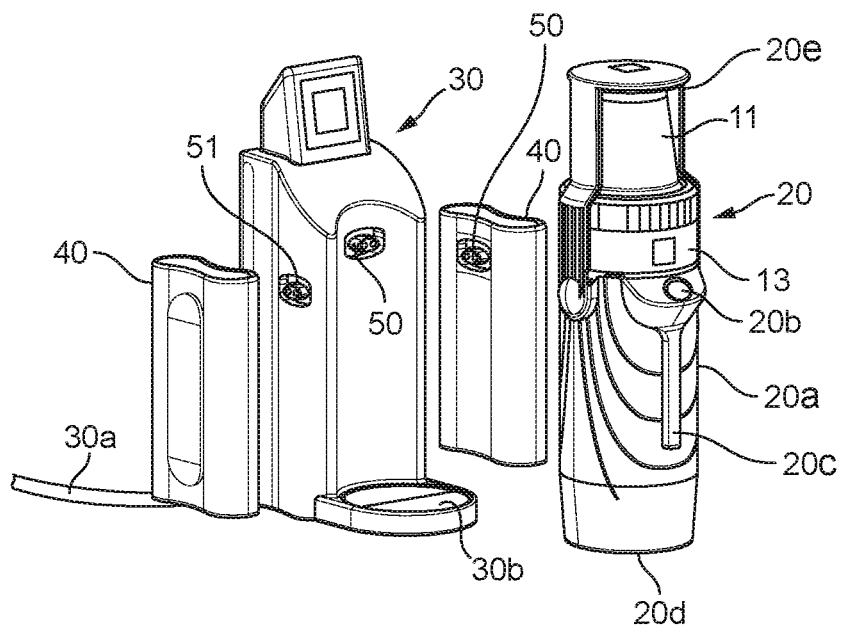
FIG. 1b is a perspective exploded assembly drawing of a system comprising the portable beverage preparation device as shown in FIG. 1a, a docking station and a battery unit.

FIGS. 1a and 1b show perspective side views of a particular (but non-limiting) embodiment of the portable beverage preparation device 20. The device 20 is adapted for being electrically and mechanically connected to a docking station 30 which is electrically connected to the mains via a power cable 30a. The docking station 30 is adapted to support battery units 40 which are designed for being electrically and mechanically connected to the docking station via connecting members 50, 51.

The beverage preparation device 20 itself also comprises an electric connection means 51 (see FIG. 2) to which the docking station 30 or a battery unit 40 may be connected. Further, a power cable (not shown) may as well be connected to the electric connection means 51 of the device 20 for providing the device with power.

In certain non-limiting embodiments, the device 20 comprises a housing 20a and a lid member 13 arranged at a top portion of the housing 20a. The lid member comprises an upper support surface 12 on which a receptacle 11 may be arranged. In certain non-limiting embodiments, the receptacle 11 and the support surface 12 are designed for enabling a support of the receptacle 11 in an operating state of the device as shown in FIG. 1a, as well as in a transport state of the device as shown in FIG. 1b.

In certain non-limiting embodiments, the device 20 is further equipped with a user interface 20b. In certain non-limiting embodiments, the user interface comprises at least a start/stop button for enabling a user to selectively start and stop the beverage preparation by means of the device. In certain non-limiting embodiments, the device further comprises a window 20c for enabling a user to control the liquid level in a liquid reservoir 8 (see FIG. 2) of the device.

In certain non-limiting embodiments, the device 20 comprises an essentially vertical cylindrical form. In an operating state, the device stands, in certain non-limiting embodiments, on a round front respective bottom surface 20d. In certain non-limiting embodiments, the bottom surface 20d and a support surface 30a of the docking station 30 are of conformal shape in order to guarantee a stable positioning of the device 20 when being connected to the dockings station 30.

In certain non-limiting embodiments, the device 20 further comprises a handle 20e that is pivotally arranged at the housing 20a and extends from a central portion of the device towards an upper portion thereon. In certain non-limiting embodiments, the handle 20e extends upwardly beyond the support surface 12 of the lid member 13. Thereby, in certain non-limiting embodiments, the handle 20e is shaped to support the receptacle 11 during transport of the device such as e.g. indicated in FIG. 1b.

Figure 2:
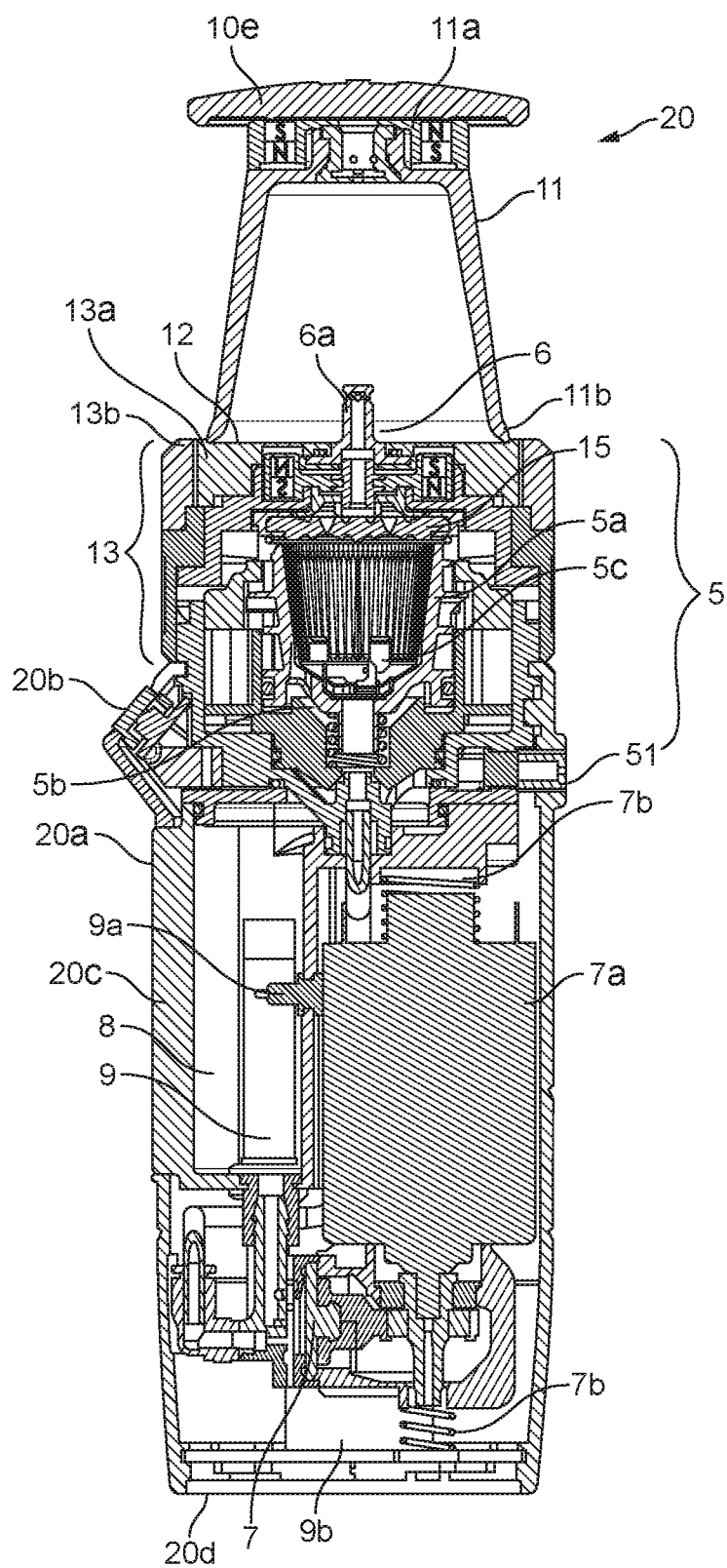
FIG. 2 relates to a sectional side view of a particular (but non-limiting) embodiment of the portable beverage preparation device in a storage or transport position.

FIG. 2 relates to a sectional side view of the device 20 in a transport or storage mode thereof. Thereby, the receptacle 11 is placed with its circumferential upper edge 11b on the support surface 12 of the device. The support surface 12 may have dedicated engagement means such as a circular protrusion enabling a clamping engagement with the edge 11b of the receptacle. As further indicated in the figure, the handle 20e is arranged to press against the bottom 11a of the receptacle. Accordingly, the receptacle 11 may be safely retained between the handle 20e and the support surface 12 of the device during transport and storage.

The device comprises a pump 7 such as a membrane pump, and which is connected to a motor 7a. In certain non-limiting embodiments, the pump 7 and/or the motor 7a are vibration-decoupled from the housing 20, e.g. by means of springs 7b. The device further comprises a liquid reservoir 8 that is in fluid connection with the pump 7, and a heating means 9. The heating means 9 may comprise a temperature sensor 9a. In certain non-limiting embodiments, the device also comprises a control unit 9b connected to at least the pump 7, the heating means 9 and the user interface 20b.

In certain non-limiting embodiments, the device further comprises a beverage brewing unit 5 arranged at an upper portion of the device 20. In certain non-limiting embodiments, the brewing unit 5 comprises a capsule injection cage 5a that has a conformal shape to a capsule 10 to be received therein. In certain non-limiting embodiments, the injection cage 5a has an essentially bell-shaped form at which circumference linear protrusions may be formed as indicated in the figure. These may enable a facilitated removal of the capsule from the cage 5a after beverage preparation.

The brewing unit 5 further comprises liquid inlet means 5b connected to the liquid reservoir 8, the pump 7 and the heating means 9 of the device. In certain non-limiting embodiments, the brewing unit 5 also comprises opening means 5c such as a piercing member or cutting blade, which is adapted for opening an inlet face 10a of a capsule 10 if placed within the brewing unit 5.

An upper portion of the brewing unit 5 is, in certain non-limiting embodiments, formed by the removable lid member 13 which may be selectively connected to the lower portion of the brewing unit 5. The lid member 13 comprises an outer circumferential lid portion 13b and an inner central lid portion 13a which are arranged freely rotatable relative to each other. The lid member 13, in particular the inner central lid portion 13a is equipped with opening means 15 arranged for opening an outlet face 10b of the capsule 10 during the beverage preparation process. In certain non-limiting embodiments, the opening means 15 is a pyramidal plate comprising a horizontally arranged base plate from which a plurality of small protrusions 15a are directed downwards in direction of the outlet face 10b of the capsule 10 (see FIG. 3c). In case of increasing pressure within the capsule 10, an outlet face 10b thereof will be urged against the pyramidal plate 15 and will then tear at its protrusions 15a. The pyramidal plate 15 further comprises small liquid channels 15b enabling a fluid flow from the plate 15 towards a liquid dispensing means 6 of the lid member 13.

In certain non-limiting embodiments, the liquid dispensing means 6 are comprised by the lid member 13 and enable a fluid flow from the beverage brewing unit 5 towards the receptacle 11. The dispensing means 6 are arranged vertically above the brewing unit 5 of the device. The dispensing means 6 comprise an injection member 6a protruding from the support surface 12 for the receptacle 11. In certain non-limiting embodiments, the injection member 6a is arranged central at the support surface 12.

Figure 3A:
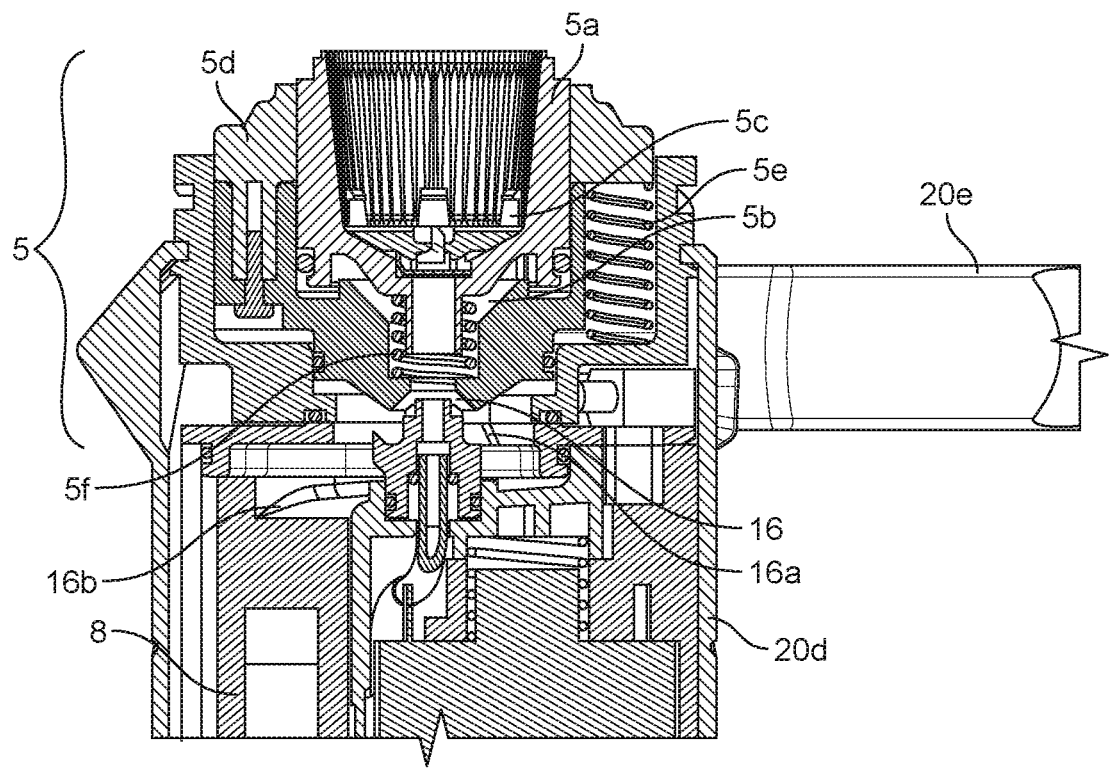
FIGS. 3a to 3c are sectional side views of the portable beverage preparation device during provision of a capsule into the brewing unit of the device.

FIG. 3a relates to a sectional side view of the device when the lid member 13 was removed from the housing 20.

In certain non-limiting embodiments, the beverage brewing unit 5 is arranged movable within the housing 20a. In particular, an external cage block 5d (see also FIG. 4b) holding the capsule injection cage 5a is arranged movable within the device 20. In certain non-limiting embodiments, the injection cage 5a is also arranged movable with respect to the cage block 5d, e.g. by means of a central spring member 5f.

In certain non-limiting embodiments, the cage block 5d holding the injection cage 5a is arranged vertically movable within the housing 20 by means of dedicated resilient means 5e such as e.g. springs. In certain non-limiting embodiments, the springs 5*e* are homogenously arranged at the circumference of the cage block 5*d* (see also FIG. 4*b*). In certain non-limiting embodiments, the cage block 5*d* is moveable between a lower position as shown in FIG. 2 in case of the lid member 13 being connected to the housing 20*a* and an upper position as shown in FIG. 3*a*, when no lid member 13 is connected to the housing 20. In its upper position, a fluid passage 16 between the injection cage 5*a* and the liquid reservoir 8 is opened. In particular an annular passage 16 is provided in the fluid communication from the pump 7 to the injection cage 5*a*, which enables the direction of fluid provided into the injection cage 5*a* to the liquid reservoir 8. Thereby, dedicated guiding means such as a liquid passage 16*a* and a guiding channel 16*b* are in fluid communication with the annular passage 16 in order to re-direct fluid provided from above in the injection cage 5*a* to the liquid reservoir 8. The cage block 5*d* may further comprise air exhausting means 25 (see FIG. 4*b*) designed for enabling a circulation of air between the liquid reservoir 8 and the exterior of the housing 20. According to such arrangement, the user may remove the lid member 13 from the brewing unit 5 and may fill liquid such as water directly into the capsule injection cage 5*a* for re-filling the liquid reservoir 8. As an alternative to such arrangement, a dedicated refill-aperture may be provided at the housing 20*a* of the device.

Figure 3B:
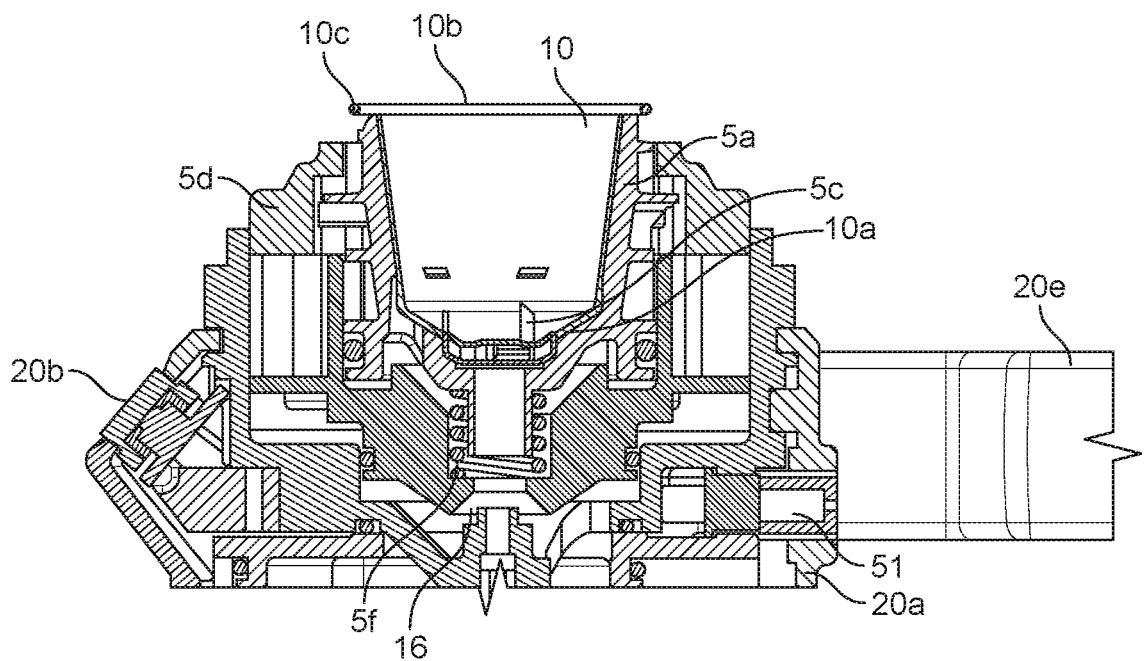

FIG. 3*b* relates to a sectional side view of the device 20 when a capsule 10 comprising beverage ingredients has been provided to the capsule injection cage 5*a*. In certain non-limiting embodiments, the capsule 10 is made from aluminium. However, the capsule may as well be made from plastic or biodegradable material. In certain non-limiting embodiments, the capsule 10 comprises a rotational-symmetric truncated-cone shaped body having an inlet face 10*a* and an outlet face 10*b*. The outlet face 10*b* is connected to a circumferential flange-like rim portion 10*c* of the capsule. Opening means 5*c* of the injection cage 5*a* are arranged to open respectively pierce the inlet face 10*a* of the capsule as depicted in FIG. 3*b*. When inserted into the device 20, the capsule outlet face 10*b* is arranged at an uppermost portion of the capsule. The inlet face 10*a* is arranged at a lowermost portion of the capsule.

Figure 3C:
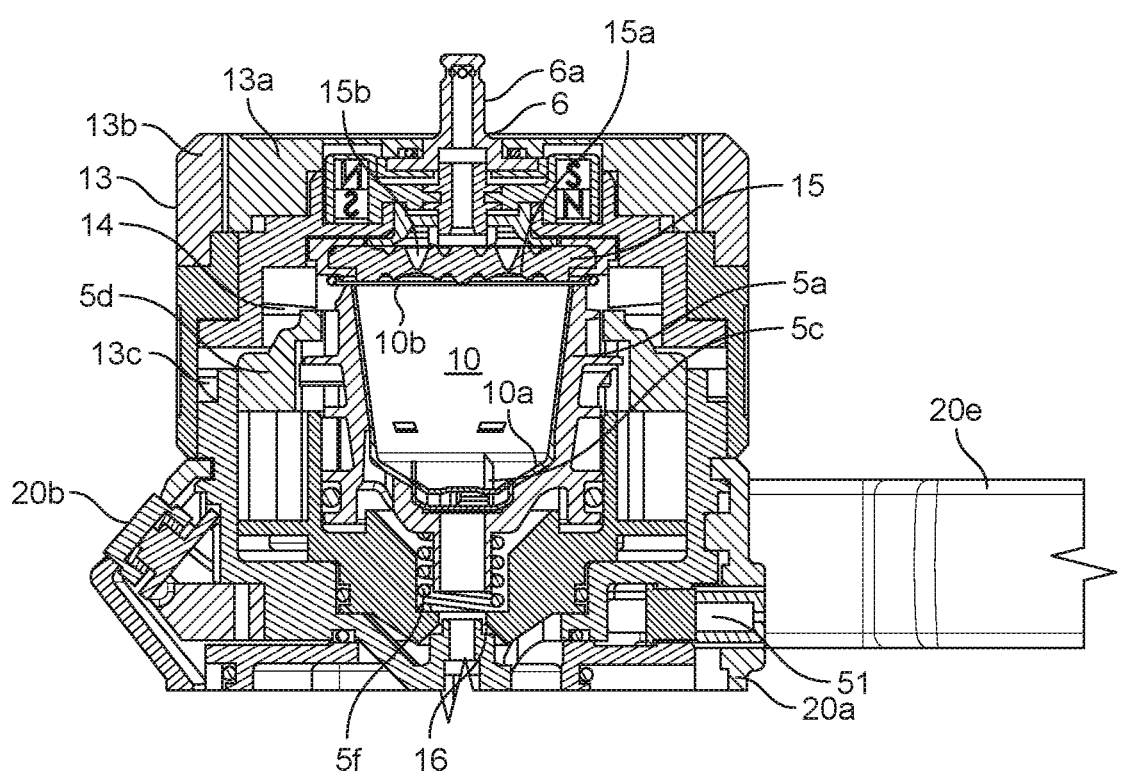

In case the lid member 13 is re-connected to the housing 20*a* as shown in FIG. 3*c*, the capsule 10 as previously provided to the capsule cage 5*a* is enclosed in the brewing unit 5 by means of the capsule cage 5*a* and the pyramidal plate 15 of the lid member 13. Thereby, the pyramidal plate 15 presses against the upper outlet face 10*b*. The lid member 13 may be connected to the housing 20*a* by means of a helical path 13*c* enabling a translatory motion of the lid member in downwards direction upon rotation of the outer part 13*b* of the lid member 13 with respect to housing 20*a*. Note that the liquid passage 16 between the capsule injection cage 5*a* and the liquid reservoir 8 is (re-)closed due to the external cage block 5*d* being pushed in a downward direction as the lid member 13 is connected to the housing 20*a*.

Further, upon (re-)connecting the lid member 13 with the housing 20*a*, the inner lid portion 13*a* will interact with rotation-prevention means 14 arranged at the beverage brewing unit 5 and in particular at the external cage block 5*d* thereof (see also FIG. 4*a*), in order to prevent a relative movement of the inner lid portion 13*a* and the capsule 10 arranged within the beverage brewing unit 5. Thereby, the inner lid portion 13*a* may comprise dedicated serrations or protrusions 13*d* (see FIG. 4*c*) that interact with the rotation-prevention means 14 of the brewing unit 5. Due to the inner portion 13*a* being freely rotationally movable with respect to the outer portion 13*b* of the lid member 13, a complete closure of the lid member 13 onto the housing 20*a* is enabled. When the lid member 13 is then disengaged from the housing 20*a* after the beverage preparation, the central portion of the lid member 13 is prevented from rotation with respect to the capsule 10 and thus, the pyramidal plate 15 is prevented from further rupturing respectively from destroying the outlet face 10*b* of the capsule 10.

Figure 3D:
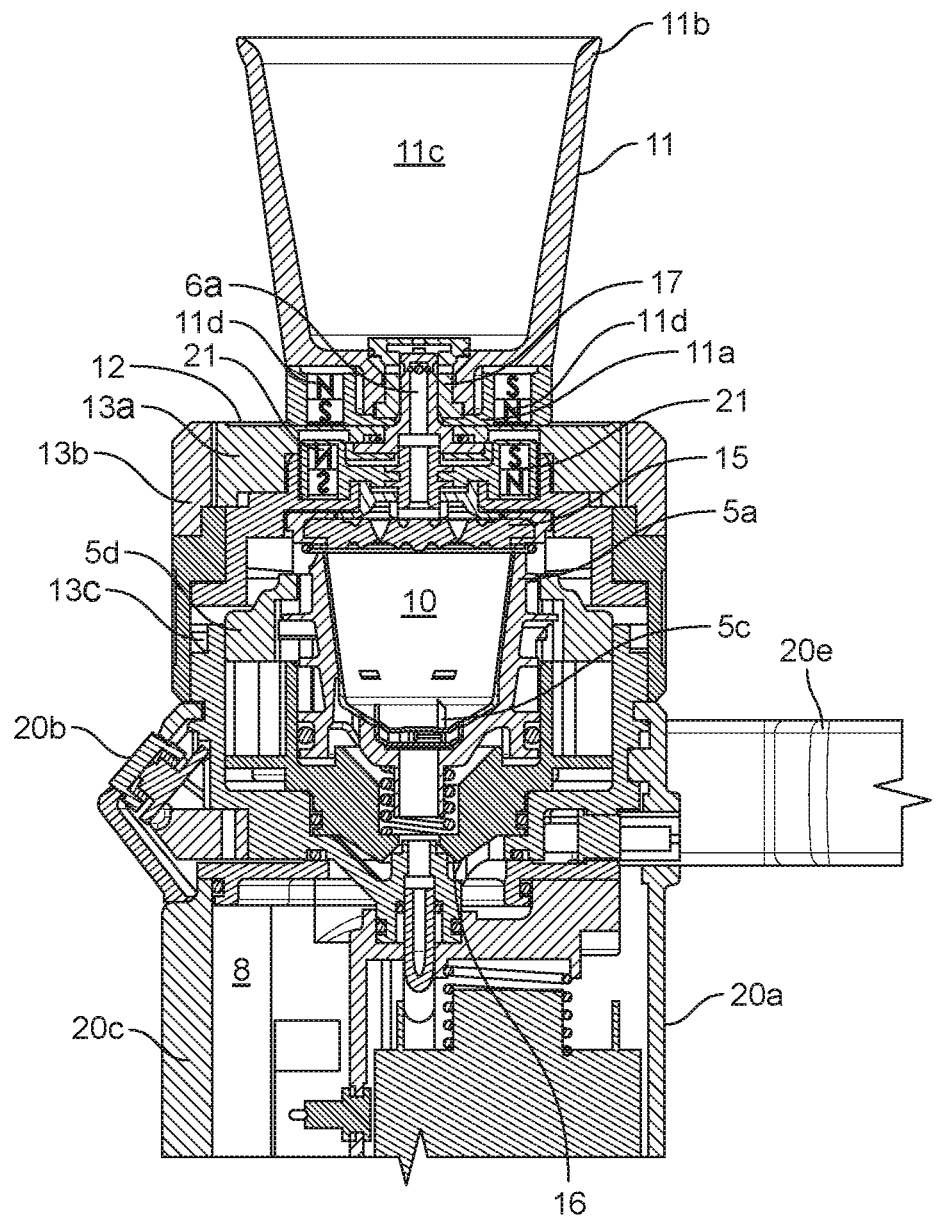
FIG. 3d is a partial sectional side view of the device in an operation state of the device, i.e. during beverage production.

FIG. 3*d* relates to an operating position of the beverage preparation device 20 according to the presently disclosed and/or claimed inventive concept(s). Thereby, the receptacle 11 is connected to the beverage dispensing means 6 of the device. This is obtained via valve means 17 arranged in a bottom portion 11*a* of the receptacle 11 which interact with the injection member 6*a* of the dispensing means 6. In particular, the injection member 6*a* when being connected to the bottom portion 11*a* urges the valve means 17 upwardly in order to enable a fluid communication between the injection member 6*a* and the interior of the receptacle 11*c*.

In certain non-limiting embodiments, the receptacle 11 comprises magnetic connecting members 11*d* that are designed to interact with magnetic connecting members 21 arranged at or below the support surface 12 of the lid member 13 when the receptacle is placed into the support surface 12. Accordingly, a magnetic force will attract the receptacle 11 towards the support surface 12 and thus, a stable connection between the receptacle 11 and the support surface 12 is ensured. The magnetic members 11*d* within the receptacle 11 and/or the lid member 13 may have an alternating polarity about the circumference of the arrangement (which, in certain non-limiting embodiments, is a circular arrangement) (see also FIG. 5*c*). Accordingly, the user may rotate the receptacle 11 in the support surface 12 in order to arrange for an equal polarity being present between the receptacle 11 and the lid member 13, thus leading to a separating force between the receptacle 11 and the support surface 12. Hence, after beverage preparation, the user may rotate the receptacle 11 to facilitate removal from the surface 12.

In case the user starts the beverage preparation by means of the user interface 20*b*, the pump 7 will provide heated pressurized liquid, in particular water, into the beverage brewing unit 5 via dedicated tubing of the device. The liquid will be provided to the capsule cage 5*a*, to the opening(s) created within the inlet face 10*a* of the capsule 10 and thus to the interior of the capsule 10. The pressure rise within the capsule leads to a deformation of the outlet face 10*b* against the pyramidal plate 15 due to which the outlet face 10*b* ruptures. A beverage resulting from the interaction of the liquid with the ingredients contained in the capsule 10 will then be urged upwardly, against gravity, in direction of the beverage dispensing means 6. Due to the established connection between the dispensing means 6 and the interior of the receptacle 11, the resulting beverage will be provided through the bottom portion 11*a* of the receptacle 11 into the interior 11*c* thereof. In certain non-limiting embodiments, the control unit 9*b* of the device stops the provision of liquid to the brewing unit 5 after a predefined amount of liquid was provided thereto. Due to the direct provision of the resulting beverage through the bottom portion 11*a* of the receptacle, spilling of the beverage is effectively prevented. It is noted that the fluid flow of the beverage in particular from the brewing unit 5 to the interior 11*c* of the receptacle 11 is, in certain non-limiting embodiments, in a common direction, in particular in a direction essentially opposite to gravity. Accordingly, in certain non-limiting embodiments, the fluid flow direction does not change from in particular the brewing unit 5 to the receptacle 11.

Figure 4A:
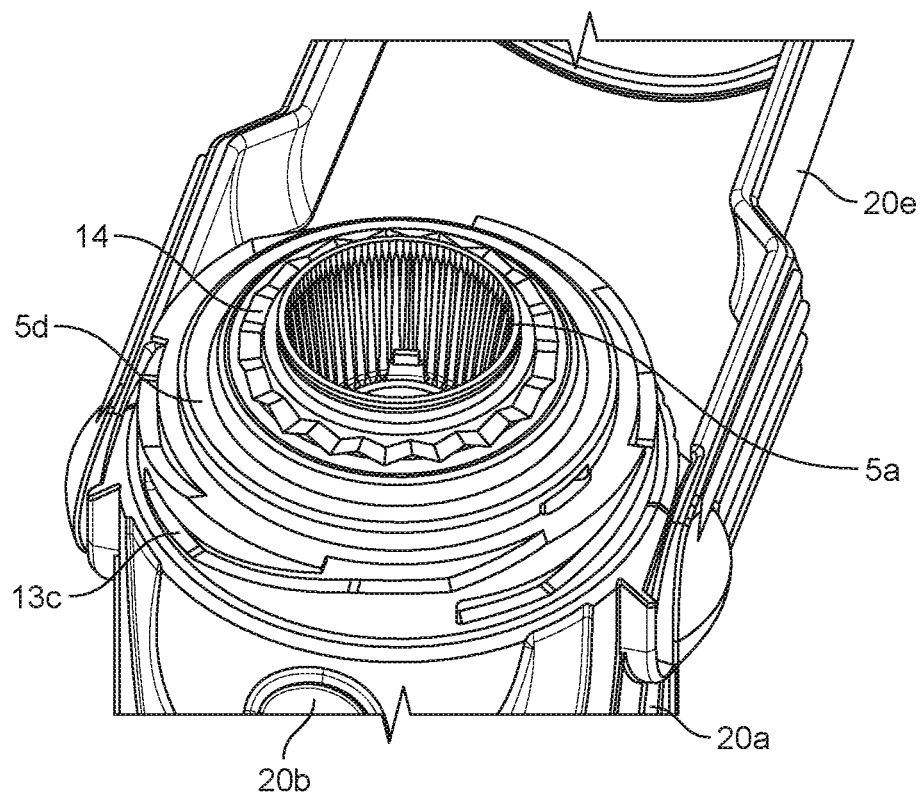
FIG. 4a is a perspective view from above of a particular (but non-limiting) embodiment of the beverage brewing unit of the beverage preparation device

FIG. 4a relates to a perspective side view onto the capsule cage block 5d and the capsule injection cage 5a when being inserted into the housing 20a of the device. As can be seen in the figure, serrations 14 are arranged, in certain non-limiting embodiments, about the circumference of an upper surface of the capsule cage block 5d, which act as rotation-prevention means when being engaged by the central portion 13a of the lid member 13.

Figure 4B:
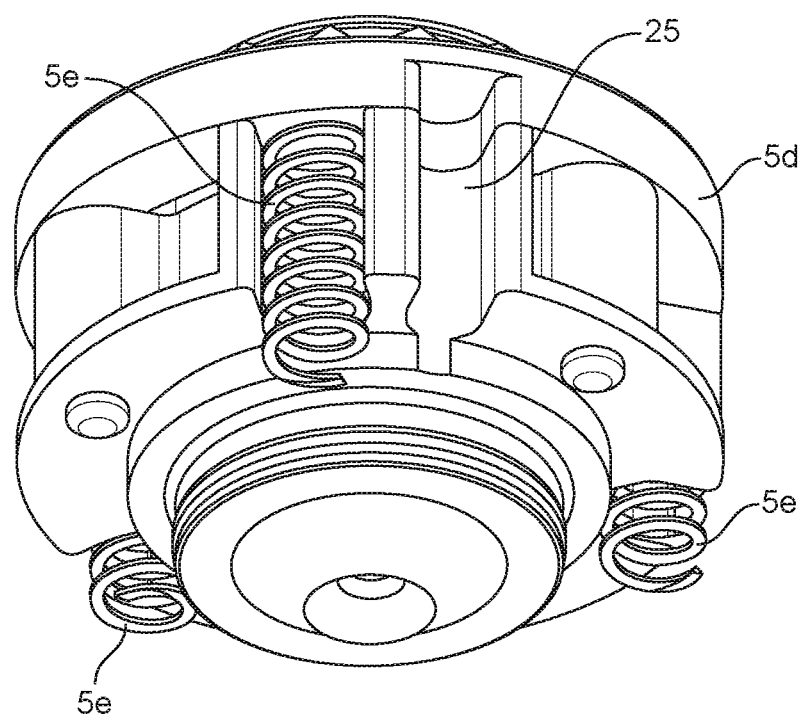
FIG. 4b is a perspective view from below of a particular (but non-limiting) embodiment of the beverage brewing unit of the device.

FIG. 4b relates to a perspective side view onto the capsule cage block 5d when being disconnected from the housing 20a. The cage block 5d comprises springs 5e arranged about the circumference of the block 5d and which are designed to urge the cage block 5d in an upwards direction in case the lid member 13 is not connected to the housing 20a.

Figure 4C:
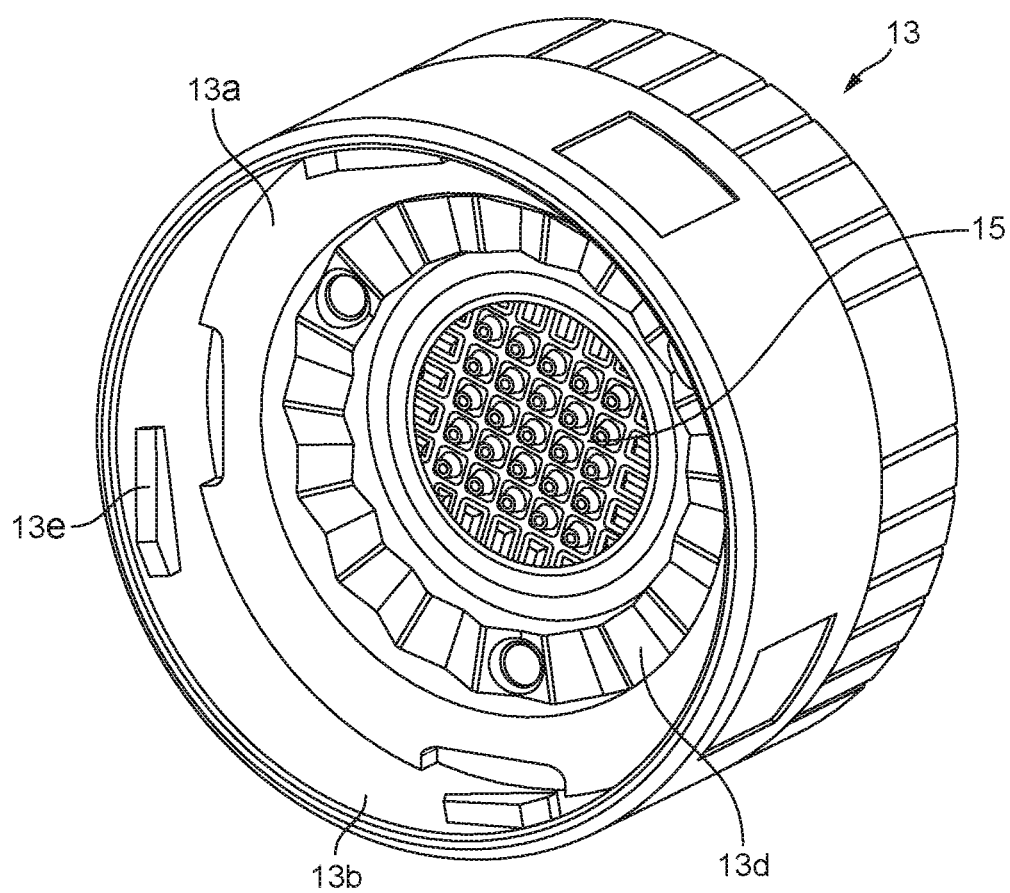
FIG. 4c is a perspective side view of a particular (but non-limiting) embodiment of a lid member for being connected to the housing of the device.

FIG. 4c relates to perspective bottom view of the lid member 13 in which the annular protrusions respectively serrations 13d are indicated. The serrations 13d protrude from a lower surface arranged at the circumference of the pyramidal plate 15 and are designed to interact with serrations 14 of the cage block 5d (see FIG. 4a). As shown in the figure, an inner surface of the outer lid portion 13b comprises connecting members 13e designed to interact with recessions 13c at the housing 20a of the device (see FIG. 3d) for connecting the lid member 13 to housing 20a.

Figure 5A:
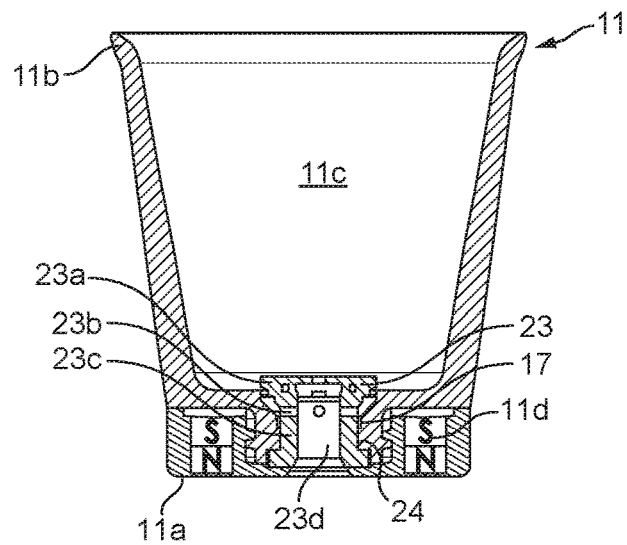
FIGS. 5a and 5b relate to a particular (but non-limiting) embodiment of a receptacle for being connected to the device according to the presently disclosed and/or claimed inventive concept(s), the receptacle comprising selective openable valve means.
Figure 5B:
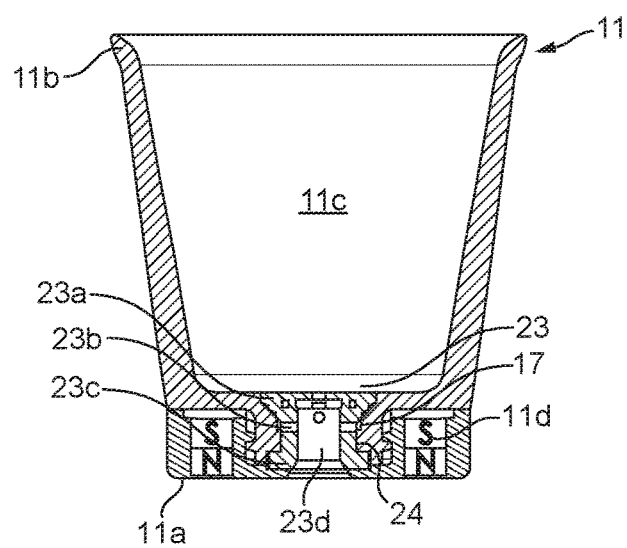

FIGS. 5a and 5b show the receptacle 11 designed for being connected to device 20. Thereby, FIG. 5a shows the valve means 17 of the receptacle in their open state and FIG. 5b relates to the valve means 17 being closed.

In certain non-limiting embodiments, the valve means 17 comprises an elastic part 23 that is extensible in vertical length when engaged by the beverage injection member 6a of the beverage dispensing means 6 of the device 20. Thereby, in certain non-limiting embodiments, the elastic part 23 comprises a lower part 23c that is fixed within an essentially vertical aperture 24 provided in the bottom portion 11a of the receptacle. Upon extension of the part 34 in an upwards direction due to the injection member 6a (not shown in the figure) being introduced into a vertical bore 23d of the part 23, an upper portion 23a of the part 23 extends beyond the vertical aperture 24 in the bottom portion 11a of the receptacle, such that fluid communication between the interior 11c of the receptacle 11 and the vertical bore 23d is enabled due to radially extending bores 23b within the elastic part 23. When the valve means 17 are disengaged from the protruding injection member 6a, the elastic part 23 will retract and thus close the radially extending bores 23b. Further, any liquid provided to the interior 11c will exert a downwards-directed force onto the part 23 in order to keep the valve means 17 closed.

Figure 5C:
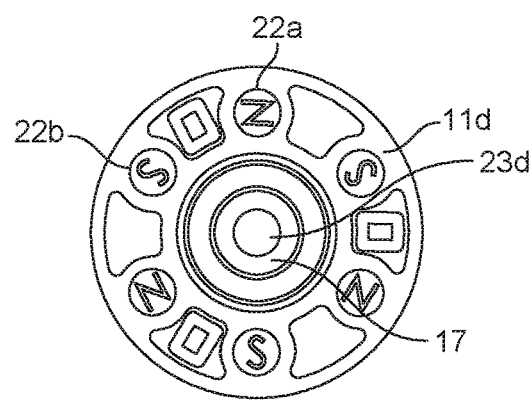
FIG. 5c relates to a bottom view of a particular (but non-limiting) embodiment of the receptacle as shown in FIGS. 5a and 5b.

FIG. 5c shows a bottom view of the receptacle 11, in which the magnetic members 11d are indicated with their different polarities 22a, 22b as described above. In particular, the magnetic members 11d are provided in circular arrangement about at the bottom portion 11a of the receptacle 11. Thereby, the differing polarities 22a, 22b relating to North and South pole of a magnet are arranged to alternate within the circular arrangement.

It is noted that although the presently disclosed and/or claimed inventive concept(s) has been described with reference to particular (but non-limiting) embodiments thereof, many modifications and alternations may be made by a person having ordinary skill in the art without departing from the scope of the presently disclosed and/or claimed inventive concept(s) which is defined by the appended claims.

The invention claimed is:

1. A beverage preparation device for preparing a beverage from an ingredients containing capsule, the device comprising:
   a beverage brewing unit for receiving the capsule and preparing the beverage from the ingredients within the capsule by means of injection of pressurized liquid into the capsule, wherein the beverage brewing unit is designed for passing liquid through the capsule in a direction essentially opposite to gravity,
   beverage dispensing means connected to the beverage brewing unit and designed to selectively connect to a bottom of a receptacle for dispensing the resulting beverage into the receptacle,
   a lid member selectively connectable to a housing of the device and designed for enclosing the capsule within the beverage brewing unit, the lid member comprising an outer circumferential lid portion and an inner central lid portion which are arranged rotatably relative to each other, and
   rotation-prevention means arranged at the beverage brewing unit, wherein the inner central lid portion is designed to selectively interact with the rotation-prevention means in order to prevent a relative movement of the inner central lid portion and the capsule arranged within the beverage brewing unit.

2. The beverage preparation device according to claim 1, wherein the flow path of liquid through the beverage brewing unit and the beverage dispensing means is in a common upward direction.

3. The beverage preparation device according to claim 1, wherein the flow path of liquid from a pump of the device to the beverage brewing unit and the beverage dispensing means is in a common upward direction.

4. The beverage preparation device according to claim 1, wherein the dispensing means comprise an injection member protruding from a support surface for the receptacle.

5. The beverage preparation device according to claim 1, wherein the lid member comprises the beverage dispensing means of the device.

6. The beverage preparation device according to claim 1, wherein the lid member of the device comprises a pyramidal plate against which an outlet face of the capsule is urged upon rising pressure within the capsule during injection.

7. The beverage preparation device according to claim 1, wherein the beverage brewing unit is arranged moveable within a housing of the device such as to selectively open a fluid-connection between the beverage brewing unit and a fluid reservoir of the device.

8. The beverage preparation device according to claim 7, wherein the fluid-connection between the beverage brewing unit and the fluid reservoir is opened dependent on the provision of a lid member to the device.

9. A system comprising:
   a beverage preparation device according to claim 1; and
   a receptacle comprising valve means in a bottom portion thereof through which liquid may be selectively provided by means of the dispensing means of the device.

10. A method for preparing a beverage from ingredients contained within a capsule, the method comprising the steps of:
    connecting a beverage receptacle to a beverage dispensing means of the beverage preparation device of claim 1,
    passing liquid through an ingredients containing capsule in a direction essentially opposite to gravity,
    dispensing the resulting beverage into the receptacle through a bottom of the receptacle.

11. The method according to claim 10, further comprising the step of passing the liquid from a pump through the capsule into the receptacle in a common direction.

\* \* \* \* \*